Patented May 31, 1932

1,860,624

UNITED STATES PATENT OFFICE

KARL SAUERWEIN, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY

PRODUCTION OF ETHYLENE FROM ACETYLENE

No Drawing. Application filed January 3, 1930, Serial No. 418,407, and in Germany January 25, 1929.

This invention relates to improvements in the manufacture and production of ethylene from acetylene.

The method already known for the production of ethylene by catalytic hydrogenation of acetylene or gases containing acetylene, such as are obtained, for example by treatment of hydrocarbons, such as methane, or natural gas in an electric arc, with hydrogen is attended with the difficulty that the reaction, which at first proceeds practically quantitatively soon comes to a standstill in consequence of the formation as by-products of high polymeric oily products having a brown colour and a pungent smell, which render the catalyst soiled and inactive.

I have now found that this difficulty is readily obviated when, in the aforesaid hydrogenation, provision is made for the presence of about 5 to 20 per cent by volume of water vapour in the gas mixture under treatment. The operation is preferably carried out with flowing gases. In consequence of the presence of the said amount of water vapour the formation of the oily products above referred to, is not only suppressed to a great extent, but any oily substances which may be formed as by-products in small amounts by undesired polymerization, have a smaller molecular weight, than the oil which is formed in the processes already known. Moreover since the oil is readily volatile in water vapour, when working with flowing gases, the oily product is continually carried away from the catalyst chamber by the water vapour and the catalyst therefore cannot become soiled. The water vapour also has the effect of absorbing and leading away the heat of the reaction. In this manner the catalyst retains its full activity even after use for a long period of time. The employment of the said amount of water specified is of considerable importance, since if too much water vapour is employed the activity of the catalyst is impaired, and if too little water vapour be employed it has no influence at all.

As catalysts, the usual hydrogenation catalysts may be employed, as for example nickel, copper, cobalt, chromium, the oxides of the same, palladium and the like either alone or in admixture with each other or with other substances, for example oxides or silicates including carrier substances.

The mixing of the water vapour with the gases is preferably carried out by passing the mixture of acetylene and hydrogen before its entry into the catalyst chamber through an evaporator containing water heated to a temperature of from about 95° to 96° centigrade. The stream of gas thus becomes laden with an amount of water vapour corresponding to the saturation pressure of water at this temperature. The process may be carried out at atmospheric, elevated or somewhat reduced pressure.

The process according to the present invention allows of the production of ethylene in a yield of 90 to 92 per cent from stoichiometrical proportions of acetylene and hydrogen in a perfectly continuous manner. It is possible to obtain yields of up to 98 per cent of ethylene without any substantial formation of ethane, even when working with a considerable excess of hydrogen.

The following examples will further illustrate the nature of this invention but the invention is not restricted thereto. The parts are by weight.

*Example 1*

A mixture of 46 per cent of acetylene, 50 per cent of hydrogen and 4 per cent of nitrogen is led first through an evaporator containing water heated to a temperature of from 95° to 96° centigrade and then through a chamber heated to about 100° centigrade, in which is arranged a catalyst containing palladium. The catalyst may be prepared for example in the following manner: 1 part of palladious chloride is brought into solution in 500 parts of water by the introduction of a little dilute hydrochloric acid, the solution is added to a suspension of 300 parts of kieselguhr in 4000 parts of water and the whole is then treated with hydrogen for 3 hours at ordinary temperature so that the palladium salt is reduced. After filtering off by suction, washing and drying, the powder is applied together with 250 parts of water-glass onto 780 parts of granular pumice stone and dried.

The rate of flow of the gas through the catalyst chamber is regulated in such a manner that the temperature of the catalyst chamber amounts to from about 105° to 120° centigrade. With a throughput of 110 litres of the mixture of acetylene, hydrogen and nitrogen per hour, 56 litres of a gas mixture per hour are obtained after separation of the water vapour, which contains 81.4 per cent of ethylene besides hydrogen, nitrogen and small amounts of acetylene, and this corresponds to a yield of 90 per cent of the theoretical yield.

*Example 2*

1.8 cubic metres of a mixture of acetylene and hydrogen, containing 43 to 44 per cent of aceytlene, are passed hourly through a vaporizer in which 200 cubic centimetres of water are evaporated per hour. The amount of water vapour thus added to the gas mixture corresponds to 14.5 per cent by volume of the gas mixture at 100° C. The gas mixture thus laden with water vapour is passed from above into a reaction vessel containing a catalyst which consists of an iron cylinder, 1 metre in height and 40 centimetres in breadth, on the bottom of which vessel 20 litres of a catalyst are arranged on a sieve plate. The said catalyst which contains 0.025 per cent by weight of palladium and which is prepared by dissolving 10 grams of palladious chloride in about 5 litres of water, acidified with hydrochloric acid, and adding the solution to a suspension of 3 kilograms of diatomaceous earth in 40 litres of water, the mixture then being subjected to reduction treatment at room temperature by passing in hydrogen for about 3 hours. After filtering off the solid material by suction, washing and drying, the powder thus obtained is applied with the aid of 2.5 kilograms of water glass to 20 litres of granular pumice stone. The mass is then dried. The catalyst is heaped to a depth of about 30 centimetres in the reaction vessel. The free space above the catalyst serves for more thoroughly mixing the gases and the water vapour. Iron spiral coils are arranged throughout the catalyst space through which coils water or oil flows which serves in the first place for heating and later when the reaction has commenced possibly for cooling the catalyst zone. The reaction temperature is advantageously maintained at beween about 105 and 120° C. The gas leaving the reaction vessel is passed through a condenser serving as a cooler and is then passed into a gasometer. The gas mixture, which has been subjected to conversion contains 80 to 82 per cent by volume of ethylene which corresponds to a yield of about 90 per cent.

*Example 3*

A gaseous mixture containing about 11 per cent of acetylene and about 88 per cent of hydrogen is laden with water vapour in the manner described in Example 2 and is then passed at a temperature of about 90 to 100° C. in the manner described in the said example over a catalyst prepared from a palladium salt and water glass. 11 cubic metres of the initial gaseous mixture when subjected to the said treatment furnish 9.1 cubic metres of a reaction gas containing 12 to 13 per cent of ethylene which corresponds to a yield of about 91 to 98 per cent of the theoretical.

*Example 4*

A gaseous mixture having the same composition as that described in Example 1 is passed under the same conditions over a catalyst containing 13.2 per cent of nickel, 3 per cent of cobalt and 0.32 per cent of chromium oxide. A carrier consisting of pumice stone is employed. The reaction gas contains 65 per cent of ethylene.

*Example 5*

A gaseous mixture having the same composition as that described in Example 1 is passed under the same conditions over a catalyst containing 10 per cent of nickel and 1 per cent of aluminium oxide deposited on pumice stone. The reaction gas contains 63 per cent of ethylene.

*Example 6*

A gaseous mixture containing about 45 per cent of acetylene and 52.5 per cent of hydrogen is laden with water vapour in the manner described in Example 1 and is then passed at a temperature of between about 125 and 130° C. under the same conditions as those described in the said example over a catalyst prepared as follows: 20 grams of water glass are dissolved in 1 litre of water and are completely precipitated by an addition of calcium nitrate. The precipitate is filtered off by suction and is washed free from calcium nitrate. The precipitate is mixed with 10 grams of nickel oxide and is deposited on pumice stone. It is reduced at 360 to 400° C. with hydrogen. A gas mixture containing 70.2 per cent of ethylene is thus obtained.

I claim:—

1. In the production of ethylene by catalytic hydrogenation of a gas comprising acetylene, the step of adding about 5 to 20 per cent by volume of water vapor to the gas mixture under treatment.

2. In the production of ethylene by catalytic hydrogenation of a gas comprising acetylene, the step of adding about 5 to 20 per cent by volume of water vapor to the gas mixture under treatment and of operating with flowing gases.

3. In the production of ethylene by catalytic hydrogenation of a gas comprising acetylene, the step of adding about 5 to 20 per cent by volume of water vapor to the gas mixture under treatment and of operating in the presence of nickel deposited on a carrier.

4. A process for the production of ethylene, which comprises passing a gaseous mixture comprising acetylene and hydrogen charged with about 5 to 20 per cent by volume of water vapor at a temperature of about 125 to 130° C. over a catalyst comprising nickel deposited on pumice stone.

In testimony whereof I have hereunto set my hand.

KARL SAUERWEIN.